United States Patent
Kubo et al.

[15] 3,693,154
[45] Sept. 19, 1972

[54] METHOD FOR DETECTING THE POSITION AND DIRECTION OF A FINE OBJECT

[72] Inventors: Moritada Kubo; Yoshiaki Arimura, both of Tokyo, Japan

[73] Assignee: Tokyo Shibaura Electric Co., Ltd., Kawasaki-shi, Japan

[22] Filed: Dec. 11, 1970

[21] Appl. No.: 97,390

[30] Foreign Application Priority Data

Dec. 15, 1969 Japan ....................44/100421

[52] U.S. Cl. .......340/146.3 H, 178/6.8, 235/61.11 E
[51] Int. Cl. .............................................G06k 7/14
[58] Field of Search ..235/61.11 E, 61.11 F, 61.11 G; 340/146.3 H, 146.3 AH, 146.3 R, 146.3; 250/219 D, 219 DR; 178/5.4 M, 6.8

[56] References Cited

UNITED STATES PATENTS

| | | |
|---|---|---|
| 3,603,728 | 9/1971 | Arimura .................340/146.3 |
| 3,553,437 | 1/1971 | Boothroyd..........340/146.3 H |
| 3,546,670 | 12/1970 | Glass et al...........340/146.3 D |
| 3,558,899 | 1/1971 | Morgan .................250/219 D |

Primary Examiner—Maynard R. Wilbur
Assistant Examiner—Leo H. Boudreau
Attorney—Flynn & Frishauf

[57] ABSTRACT

A method for detecting the position of a semiconductor pellet which comprises the steps of affixing to the surface of the semiconductor pellet a position detecting pattern generating upon scanning pulses of prescribed width, interval and number, picking up the image of said pellet, scanning the pattern image with six scanning lines $L_1$ to $L_6$ to obtain signals $L_1'$ to $L_6'$ using a first group of delay circuits, treating said signals in a logical circuit including a second group of delay circuits to obtain logical output expression as $$(L_1'+L_2')\cdot(L_3'+L_4')\cdot(L_5'+L_6')+(L_1'\cdot L_2'\cdot L_3')=1$$

and calculating the position of the semiconductor pellet using said logical outputs.

10 Claims, 9 Drawing Figures

FIG. 2
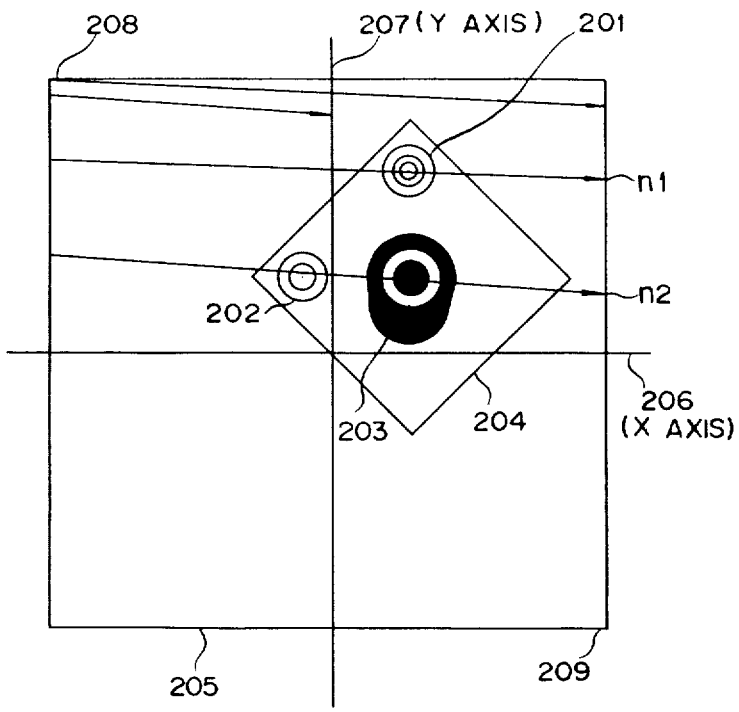
FIG. 3
FIG. 3A
FIG. 3B
FIG. 3C

FIG. 7
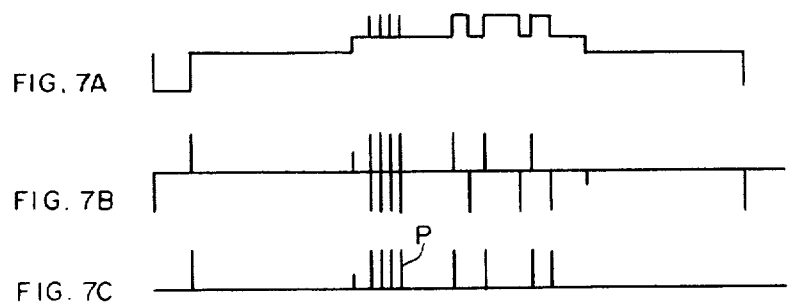
FIG. 7A
FIG. 7B
FIG. 7C
FIG. 8
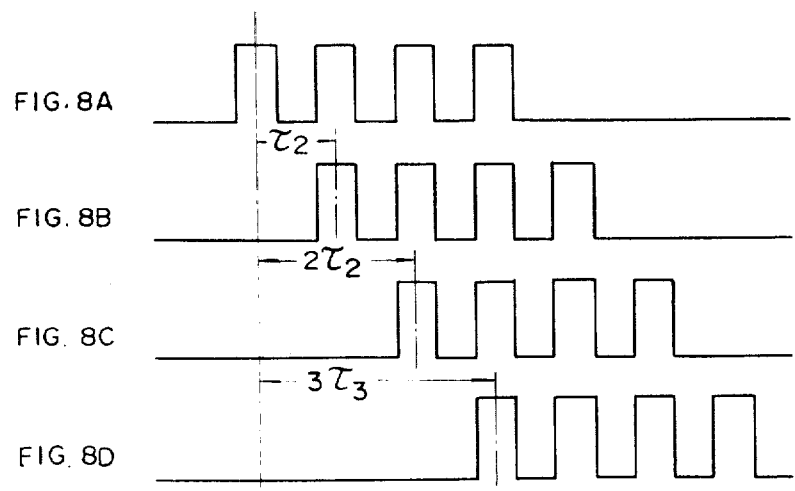
FIG. 8A
FIG. 8B
FIG. 8C
FIG. 8D ically observing the shape of the fine object or a pattern specifically associated therewith. However, this method has the drawback that various objects naturally have different shapes and patterns, making it necessary to devise a number of detection methods corresponding to the kinds of said objects. To eliminate such shortcomings, it may be contemplated to use a detection pattern particularly selected for a fine object. In this case, however, detection can not be performed with full reliability due to omission of part of the signals obtained from such pattern or occurrence of other false signals than the required pattern signals.

METHOD FOR DETECTING THE POSITION AND DIRECTION OF A FINE OBJECT

The present invention relates to a method for detecting the position and direction of a fine object.

Fine objects, for example, semiconductor pellets should have their position detected during fabrication. Such detection has heretofore been conducted by optically observing the shape of the fine object or a pattern specifically associated therewith. However, this method has the drawback that various objects naturally have different shapes and patterns, making it necessary to devise a number of detection methods corresponding to the kinds of said objects. To eliminate such shortcomings, it may be contemplated to use a detection pattern particularly selected for a fine object. In this case, however, detection can not be performed with full reliability due to omission of part of the signals obtained from such pattern or occurrence of other false signals than the required pattern signals.

It is accordingly the object of the present invention to provide an automatic method for detecting the position and direction of a fine object which is free from the drawbacks encountered with the prior method and capable of effecting detection with greater reliability.

SUMMARY OF THE INVENTION

The present invention detects the position and direction of a fine object having a pattern thereon as will generate pulses of prescribed width, interval and number, by scanning at least with six scanning lines a magnified image of said pattern, operating on the resulting signals in a logical circuit including at least first and second delay circuits and detecting the position and direction of the fine object by those of outputs from the logical circuit which meet the preset conditions, thereby eliminating the occurrence of false signals generally accompanying said scanning and the erroneous detection of pattern signals due to partial omission thereof.

The present invention can be more fully understood from the following detailed description when taken in connection with the appended drawings, in which:

FIG. 2 illustrates the relationship of a magnified view of the fine object and the scanning lines used;

Figure 4:
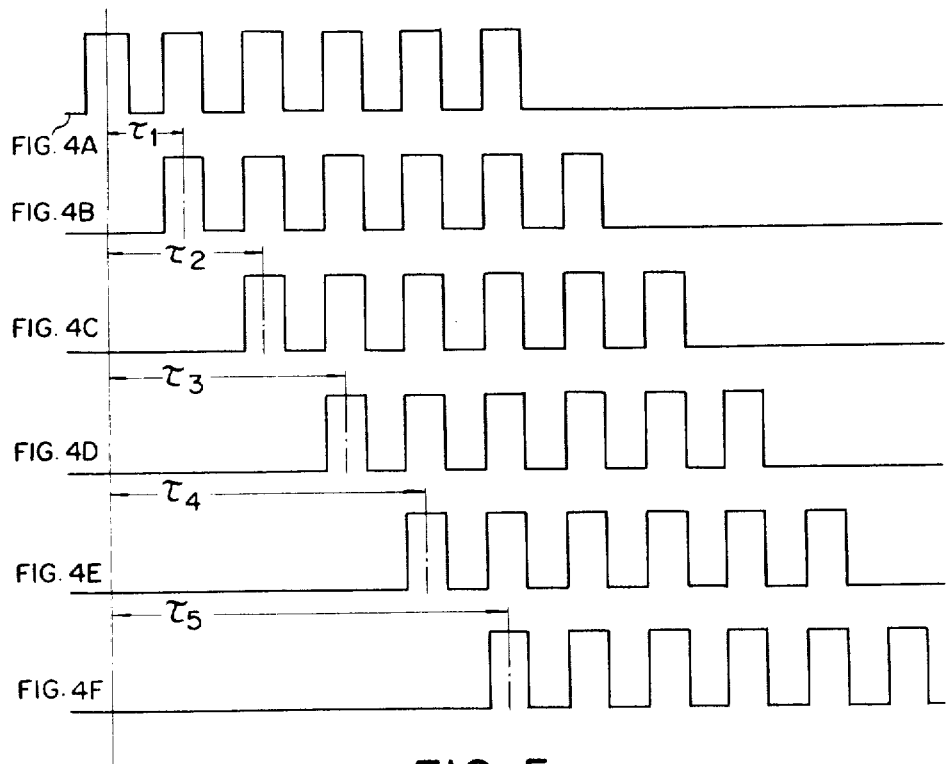
Figure 5:
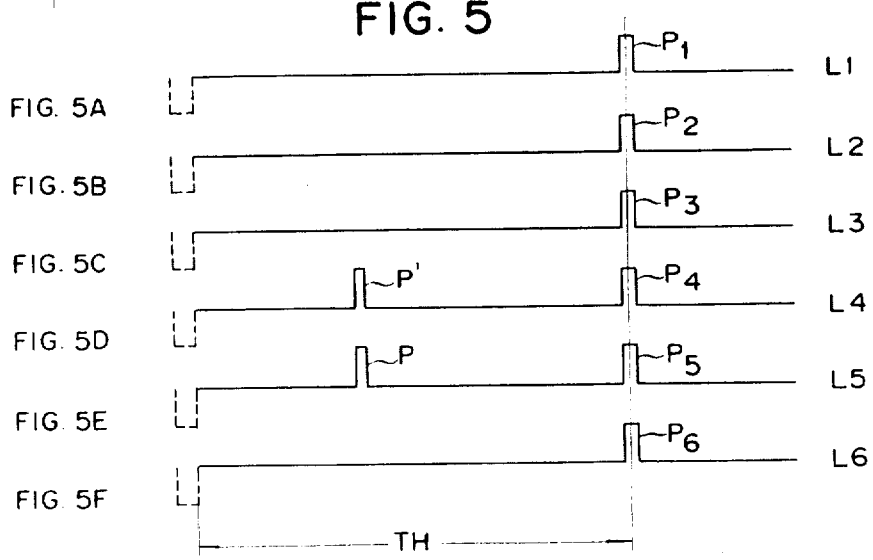
Figure 6:
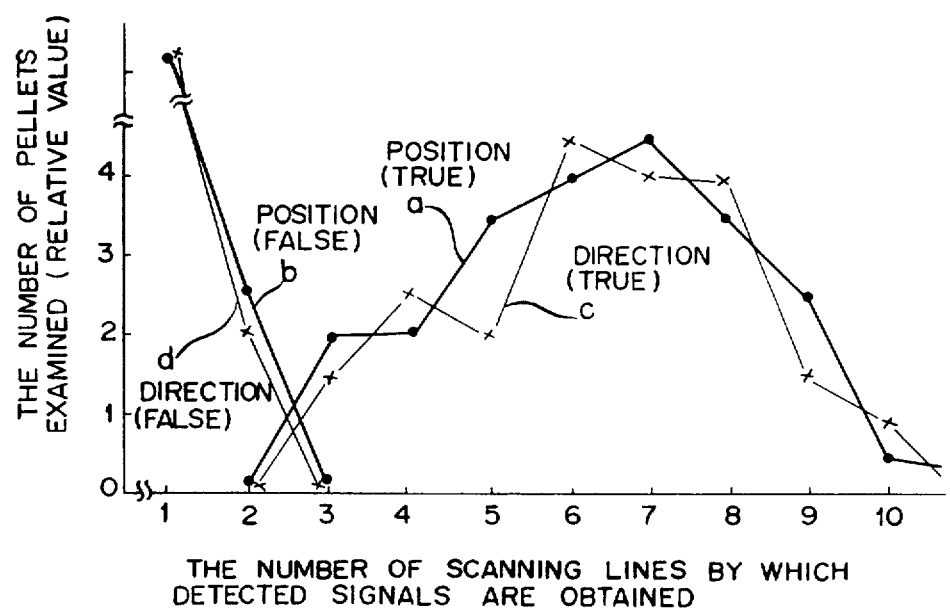
Figure 9:
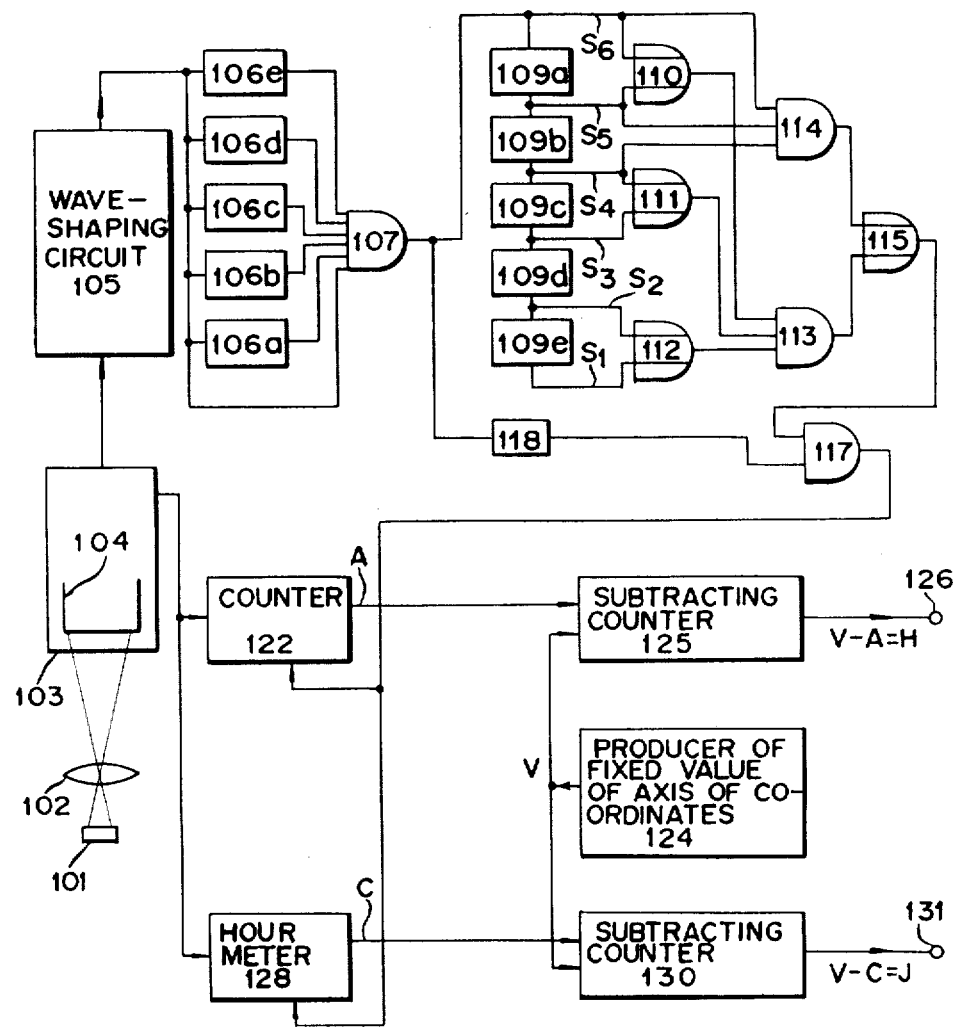

FIG. 3 indicates the wave form of signals obtained by scanning the image of a pattern for detection of the position of the fine object and the shaped wave form thereof;

FIG. 4 shows the time delay of detected signals with respect to the scanning line of the image of the position detecting pattern;

FIG. 5 represents the relationship of true detecting signals obtained by scanning the position pattern image and false signals;

FIG. 6 sets forth the manner in which there were experimentally generated true and false detection signals in scanning the pattern images for detecting the position and direction of the fine object;

FIG. 7 illustrates the wave form of signals obtained by scanning the image of the direction detecting pattern of FIG. 2;

FIG. 8 represents the time delay of detection signals with respect to the scanning lines of the direction detecting pattern; and FIG. 9 is a block circuit diagram of a method for detecting only the position of the fine object according to another embodiment of the invention.

There will now be described by reference to the appended drawings an embodiment of the method of the present invention. The method includes the case where the position of a fine object is detected by affixing only a position detecting pattern thereto and the case where both position and direction of the fine object are detected using signals associated with two patterns for detecting said position and direction. While the later embodiment relates to the detection of the position and direction of the fine object, detection in the former can be effected simply by eliminating part of the electrical circuit of FIG. 1.

Figure 1:
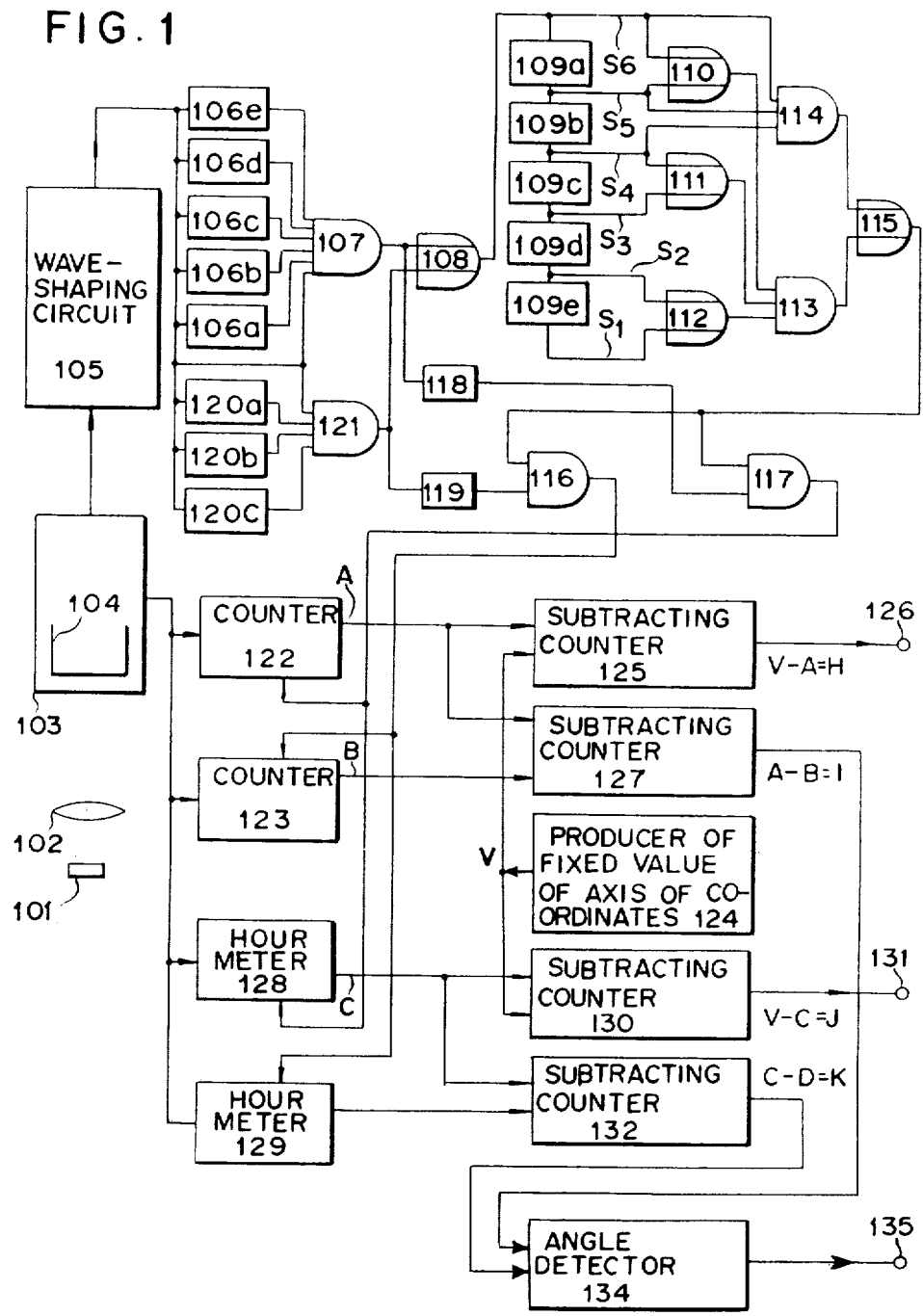
FIG. 1 is a block diagram of a method for detecting the position and direction of a fine object according to an embodiment of the present invention.

To the semiconductor pellet 101 (a fine object) of FIG. 1 are affixed, as shown in enlargement in FIG. 2, a position detecting pattern 201 and a direction detecting pattern 202. These patterns are impressed when there is photo-etched the pattern of a transistor electrode. For distinction from other patterns affixed to the semiconductor pellet 101 for the original object, the position detecting pattern 201 assumes, for example, the form of equally spaced triple concentric rings which is designed to generate pulses of prescribed width, interval (i.e., spacing) and number when there is scanned the magnified pattern image 201 focused on the scanning surface of an image pickup tube, regardless of the direction in which said semiconductor pellet 101 is disposed. In this case, when scanning is made with a single line there are generated six pulses. The direction detecting pattern 202 has, for example, the form of double concentric rings so as to provide pulses of different width, interval and number from those of the aforementioned case. Thus scanning with a single line produces four pulses.

If, at the time of scanning, there are not introduced any noise signals nor does there occur any omission in the signals obtained by scanning a pattern image, then said pattern signals can be used in detection with great reliability. Actually, however, the electrode pattern image 203 and the detected pattern images 201 and 202 do not bear a sufficiently distinct contrast with an image representing the surface of the semiconductor pellet 101. If, therefore, scanning is conducted under the condition of a dark pellet image 204 and at the limit sensitivity of an image pickup tube, then the resulting image signals will be contaminated by a great many noise signals. These noise signals contain components having the same width, interval and number of pulses as are generated in scanning the images of the prescribed detection patterns. Further, if scanning is made of images representing, for example, the surface condition of aluminum material constituting an electrode pattern, irregularities in the cut plane of a semiconductor pellet, silicon powders resulting from the dicing of the pellet or dust deposited on the pellet surface, then the resulting signals will include components having the same width, interval and number of pulses as are produced in scanning the images of the aforesaid prescribed detection patterns. Since signals contaminated by such components are not true signals obtained by the scanning of the prescribed pattern images, they will be hereinafter referred to as "false signals".

Even signals intended for detection of the prescribed patterns often present omissions in some part thereof, assuming a discontinuous form. Accordingly, such signals temporarily have to be recognized as true ones, though there may be generated several false signals during a particular scanning period. To reduce the occurrence of erroneous signals for this reason, there is employed a logical circuit including the later described delay circuit.

The semiconductor pellet 101 is subjected to vertical illumination or, to obtain a sufficient contrast, to dark field or deflected illumination. The image thus obtained is focused on the scanning surface 104 of the image pickup tube of a television camera 103. Namely, as illustrated in FIG. 2, there are focused on the scanning surface 104 of the image pickup tube falling within an optical field 205 the image 204 of the pellet 101, the image 203 of the electrode pattern, the image 201 of the position detecting pattern and the image 202 of the direction detecting pattern. To said optical field 205 are affixed axis X 206 and axis Y 207 with the origin point located at the center of said field 205.

The scanning surface 104 is scanned from one end 208 of the optical field 205 to the other end 209 with a plurality of equally spaced scanning lines parallel with axis X 206. The resulting image signals contain components having broader pulses than the proper signals for detection prescribed patterns 201 and 202. Since such image signals just as generated are not adapted for the intended detection, they are subjected to differential pulse shaping in a shaping circuit 105. There will now be described by reference to FIG. 3 the manner in which there is conducted said shaping operation. There is drawn out an untreated image signal shown in FIG. 3A which is generated by scanning the position detecting pattern 201 with a scanning line of the $n_1$ order. Said signal is differentiated into the wave form of FIG. 3B in the shaping circuit 105. Further, the rising portion of said shaped wave form is converted to pulses, namely to six signals P indicated in FIG. 3C.

These signals P associated with the position detecting pattern 201 are distinguished from other signals by delay circuits 106a to 106e and an AND circuit 107. Said signals P consist of six pulses as illustrated in FIG. 4. With the interval between the adjacent pulses designated as $\tau_1$, then there is a time difference of $(6-m)\tau\Phi_1$ between the pulse of the $m$ order and the sixth pulse. For simultaneous generation of said six pulses, the delay circuits 106a, 106b, 106c, 106d and 106e are respectively incorporated in a branch circuit so as to provide time delays, as $\tau_1$ in 106a, $2\tau_1$ in 106b, $3\tau_1$ in 106c, $4\tau_1$ in 106d and $5\tau_1$ in 106e. These five delayed signals and one non-delayed signal are conducted to the AND circuit 107. Upon the entry of the sixth non-delayed pulse, there is obtained a position detecting signal from the AND circuit 107. As described above, however, the signal from the AND circuit 107 includes false components other than the true ones required for detection of the position. These false signals possibly arise from the scanning of images representing irregularities on the surface of aluminum material constituting an electrode pattern, the uneven cut surface of the pellet 101, or the powders and dust deposited on said cut surface.

As mentioned above, the present invention uses only those signals which meet the prescribed conditions as true position detecting signals.

There will now be described a concrete embodiment. Let it be assumed that the pellet 101 has a square form 400 microns on each side, the position detecting pattern has an outer diameter of 120 microns and the images thereof are magnified 20 fold. Then there will be generated true position detecting signals on a series of about ten scanning lines which are passing through the approximate center of the pattern 201, that is, through the region within the innermost ring of the pattern 201. Referring to a series of six scanning lines $L_1$ to $L_6$ shown in FIG. 5, true position scanning signals $P_1$ to $P_6$ respectively appear on each scanning line at the same time $T_H$ after the start of scanning. However, there are also generated some false signals P'. The probability of true and false signals being produced was examined, obtaining the results of FIG. 6. In FIG. 6, the abscissa denotes the number of scanning lines on which there appeared true position detecting signals and the ordinate represents the number of the pellets tested. The curves $a$ and $b$ relate to the position detecting pattern and the curves $c$ and $d$ the direction detecting pattern. As apparent from FIG. 6, true position detecting signals appeared on three or more scanning lines (the curve $a$) and false signals occurred on two or less scanning lines (the curve $b$). It will be noted that the position detecting signals may not always be generated on the entire series of scanning lines, but present themselves by skipping over some of said lines due to the effect from the breakage of the position detecting pattern itself or dust deposited thereon.

In consideration of the results of FIG. 6, therefore, the present invention uses a delay circuit as means for distinguishing true from false position detecting signals. Namely, the provision of said delay circuit is rendered equivalent to the case where there are generated position detecting signals on the entire series of scanning lines substantially at the same time. If in this case, there simultaneously appear three or more position detecting signals on the scanning lines, then they will be considered as true signals. Since, as described above, the true position detecting signals do not always appear on the entire series of scanning lines but sometimes present themselves by skipping over some of said lines, the simultaneous generation of three or more true position detecting signals is effected using a series of scanning lines having an $n$ number ($L_1$ to $L_n$) under the condition satisfying the following theoretical equation:

$$(L_1'+L_2')\cdot(L_3'+L_4')...(L_{n-1}'+L_n')+(L_1'\cdot L_2'...L_{n/2}')=1 \quad ... \quad (1)$$

where:

$L'$ = signals appearing on the scanning lines. Where, therefore, detection is performed using the circuitry of FIG. 1, then there will be derived from the above equation $$(L_1'+L_2')\cdot(L_3'+L_4')\cdot(L_5'+L_6')+(L_1'\cdot L_2'\cdot L_3')=1 \quad ... \quad (2)$$

This also applies to the detection of the direction detecting pattern.

There will now be described by reference to the appended drawings a concrete circuit arrangement according to the present invention used in detecting a fine object. As mentioned above, the magnified image of the semiconductor pellet 101 is scanned and the resulting signals are shaped, delayed and then conducted through the AND circuit 107. Outputs from said AND circuit containing true and false position detecting signals are introduced through an OR circuit 108 and then through delay circuits 109a to 109e (FIG. 1). The time delay in each of the delay circuits 109a to 109e is previously made equal to the scanning time $H_t$ of each scanning line. When the position detecting pattern 201 of FIG. 2 is scanned there are generated true position detecting signals on about ten scanning lines. Said signals are delayed in turn to an extent equal to the scanning time of each scanning line in the delay circuits 109a to 109e. Thus output signals from the delay circuits simultaneously appear on, for example, six of said scanning lines. At this time, the non-delayed signal is also generated. The output signals from the delay circuits 109e, 109d, 109c, 109b and 109a are designated as $S_1$, $S_2$, $S_3$, $S_4$ and $S_5$ respectively and the non-delayed signal as $S_6$. It will be noted that $S_1$ is delayed by $5H_t$, $S_2$ by $4H_t$, $S_3$ by $3H_t$, $S_4$ by $2H_t$ and $S_5$ by $1H_t$ and $S_6$ is not delayed at all.

$S_6$ and $S_5$ are coupled into an OR circuit 110, $S_4$ and $S_3$ into an OR circuit 111 and $S_2$ and $S_1$ into an OR circuit 112. The outputs from the OR circuits 110, 111 and 112 are introduced into an AND circuit 113. Thus from said AND circuit 113 there are obtained only those signals which satisfy the equation $$(S_1+S_2)\cdot(S_3+S_4)\cdot(S_5+S_6)=1 \text{ or}$$

$$(L_1'+L_2')\cdot(L_3'+L_4')\cdot(L_5'+L_6')=1 \ldots (3)$$

If, therefore, there appear three or more true position detecting signals on said six scanning lines, then signals derived from the equation (3) above may be identified as true position detecting signals. Next, signals $S_6$, $S_5$ and $S_4$ are coupled to an OR circuit 114 to generate output signals satisfying the equation $$S_6 \cdot S_5 \cdot S_4 = 1 \text{ or}$$

$$L_1' \cdot L_2' \cdot L_3' = 1$$

Namely, if there appear position detecting signals on three or more successive scanning lines (which may be represented as $L_2'\cdot L_3'\cdot L_4' = 0$ 1, $L_3'\cdot L_4'\cdot L_5' = 1$, $L_4'\cdot L_5'\cdot L_6' = 1$, or preferably, $L_1'\cdot L_2'\cdot L_3' = 1$), then said signals may be recognized as true ones. Outputs from the AND circuits 113 and 114 are composed in an OR circuit 115 to obtain signals satisfying the equation (2). The composed signals are conducted to the later described circuit to define the position of the semiconductor pellet 101. Under this arrangement, appearance of, for example, two false signals on the successive ones of six scanning lines or non-successive ones thereof will not meet the equation (2) above, preventing the generation of an output from the OR circuit 115.

The foregoing description relates to the scanning of the position detecting pattern 201. The scanning of the direction detecting pattern 202 is carried out in the same manner. Depending on the direction in which said direction detecting pattern 202 is disposed, there may be scanned both patterns 201 and 202 by the same or different scanning lines.

There will now be described signals generated by the scanning of the direction detecting pattern 202. There are drawn out image signals (FIG. 7A) generated when said pattern 202 is scanned with a scanning line of the $n_2$ order. Then as in the case of scanning the position detecting pattern, said image signals are shaped in the shaping circuit 105 to draw out pulses associated with the differentiated signals of FIG. 7B and then four pulses P indicated in FIG. 7C. The detecting signals thus obtained consist of, as shown in FIGS. 8A, 8B, 8C and 8D, four pulses per scanning line. With the interval between the adjacent pulses designated as $\tau_2$, then there is a time difference of $(4 - m)\tau_2$ between the pulse of the $m$ order and the fourth pulse. The four pulses are conducted to delay circuits 120a, 120b and 120c respectively so as to be simultaneously generated. As shown in FIGS. 8A, 8B, 8C and 8D, said signals are respectively delayed as by $\tau_2$ in the delay circuit 120a, by $2\tau_2$ in delay circuit 120b and $3\tau_2$ in delay circuit 120c. The delayed signals, together with the non-delayed signal, are conducted to an AND circuit 121 to an obtain output therefrom at the moment the fourth pulse of the non-delayed signal is introduced into said AND circuit 121. Though said output may temporarily be deemed as direction detecting signals, these direction detecting signals contain false signals, as in the case of position detecting signals. When determination was made of the numbers of true and false direction detecting signals with respect to a large number of semiconductor pellets, it was found that true direction detecting signals appeared on three or more scanning lines, as shown by the curve $c$ of FIG. 6 associated with the position detecting signals, with respect to 99 percent of the pellets examined and false signals were generated on two or less scanning lines as indicated by the curve $d$ of FIG. 6. Accordingly, if there appear direction detecting signals on three or more of the successive scanning lines, then said signals will be drawn out for use as true ones. Output from the delay circuits 120a, 120b and 120c and the non-delayed signal are supplied to the AND circuit 121, the output from which is introduced through the OR circuit 108 and then delayed in the delay circuits 109a to 109e. The delayed signals are coupled to the OR circuits 110, 111 and 112 and AND circuits 113 and 114. Only those output signals which meet the following equation essentially equal to the aforesaid equation (2)

$$(S_1+S_2)\cdot(S_3+S_4)\cdot(S_5+S_6) + (S_4\cdot S_5\cdot S_6) = 1 \text{ or}$$

$$(L_1'+L_2')\cdot(L_3'+L_4')\cdot(L_5'+L_6') + (L_1'\cdot L_2'\cdot L_3)=1 \ldots (2')$$

are used as true direction detecting signals.

The characters $L_1'$ to $L_6'$ used with respect to signals for detection of both position and direction denote the scanning lines on which there are generated said signals.

Since outputs from the AND circuits 107 and 121 are composed in the OR circuit 108, the output obtained from the OR circuit 115 after operation thereof contains signals for detection of both position and direction of the semiconductor pellet 101. The required separation of both types of signals is effected using the original different locations of the position and direction patterns.

True signals for detection of both position and direction are not simultaneously generated due to the different sites assumed by both patterns. Accordingly when there is obtained an output by operation of the equation (2), namely, an output from the OR circuit 115, there are also generated the position detecting signals in the AND circuit 107. Output signals from the AND circuit 107 are more delayed than output signals from the OR circuit 115 by the operation time$\Delta Te$ of the equation (2). When, therefore, output signals from the AND circuit 107 are delayed by $\Delta Te$ in a delay circuit 118, and conducted to an AND circuit 117 together with the output from the OR circuit 115 and there are further supplied position detecting signals, then said AND circuit 117 will generate output signals. Said signals are true position detecting signals free from false ones.

The direction detecting signals are generated from the OR circuit 115 only when they satisfy the equation (2'). Output signals from said OR circuit 115 are more delayed by $\Delta Te$ than output from the AND circuit 121. When, therefore, detecting signals from said AND circuit 121 are delayed in a delay circuit 119 and supplied to the AND circuit 116 together with output from the OR circuit 115, then there are obtained true direction detecting signals from said AND circuit 116.

The position and direction of a semiconductor pellet are determined from a co-ordinate system set forth in the optical field of the position and direction patterns using the aforementioned true signals for detection of said position and direction. Axis Y of the optical field of each pattern image is defined by plotting the point on a scanning line of a particular order at which there were generated true position or direction detecting signals. The optical field 205 is scanned in parallel with axis X from one end 208 of said field to the other end 209 using parallel scanning lines having an number. That point on the scanning line 206 (axis X) of the $n/2$ order at which there were generated true detecting signals is designated as the origin point of axis Y. The origin point on axis X is defined by that point on the aforesaid scanning line 206 of the $n/2$ order which represents a time T/2 equal to half the scanning time T of each scanning line. A counter 122 connected to the scanning circuit reads axis Y of the optical field of the position detecting pattern image 201, and a counter 123 similarly connected to said scanning circuit reads axis Y of the optical field of the direction detecting pattern image 202. Namely, each of said counters 122 and 123 counts the number of scanning lines which are used between the time when the gate of said counter is opened by signals from the television camera 103 at one end 208 of the optical field 205, that is, at the point of time at which scanning is started and the time when each pattern image is scanned. When the position detecting pattern image 201 is scanned with a scanning line of the $n_1$ order, the counter 122 has its gate closed to stop counting. Values relative to said scanning line of the $n_1$ order which have been indicated on the counter 122 since the initial scanning are designated as A. Signals representing said values A are conducted to a subtracting counter 125 together with output signals from a producer 124 of fixed value of axis of co-ordinate disposed on said scanning line of the $n/2$ order so as to generate values V associated with the origin point of axis X, or Y. Thus a difference V—A is computed to obtain axis Y signals denoting said difference. It will be apparent that depending on the magnitude of said difference V—A, the detecting pattern image will be positioned as follows:

If $V-A > 0$, on + axis Y
If $V-A = 0$, at a preset point representing axis Y
If $V-A < 0$, on − axis Y At the output terminal 126 of the subtracting counter 125 are drawn out axis Y signals $V - A = H$ associated with the position detecting pattern image 201.

When the direction detecting pattern image 202 is scanned with a scanning line of the $n_2$ order, the counter 123 has its gate closed by true direction detecting signals supplied from the AND circuit 116 thereby to stop counting. Values counted up to this point by said counter 123 are designated as B. Signals representing said values B are conducted to a subtracting counter 127 together with those denoting the values A given by the aforesaid counter 122. The resulting difference $A - B$ is used as axis Y signals associated with the direction detecting pattern image. Depending on the magnitude of said difference $A - B$, the direction detecting pattern will be located as follows:

If $A-B<0$, nearer to −Y than A
If $A-B=0$, on axis Y as in case of A
If $A-B>0$, nearer to +Y than A That is, the difference $A - B = 1$ represents the displacement of the semiconductor pellet 101 toward axis Y. Axis X of the optical field of the position and direction detecting pattern images is determined in the following manner. Namely, there is measured by an hour meter 128 connected to the scanning circuit an interval between the line when there are generated signals for detecting the position pattern image 201 and the time when there are generated synchronizing signals for scanning axis X. Another hour meter 129 counts up an interval between the time when there are generated signals for detecting the direction pattern image 202 and the time when there are generated synchronizing signals for scanning axis X.

These hour meters are actuated by positive pulses obtained by differentiating negative synchronizing pulses for axis X supplied from the television camera 103, and reset by negative pulses. Now let it be assumed that the optical field is so composed as to cause axis X to bear a ratio of 1 : 1 with respect to axis Y and the scanning time of axis X is substituted by that required for scanning lines having an n number to conduct said scanning, that is, axis X is scanned by scanning lines having an n number as in the case of axis Y. Then the equivalent scanning time is T/n per scanning line. Thus there will be obtained output signals which would be generated when the aforesaid time interval is converted to the scanning time of scanning lines having said assumed number on synchronization basis with T/n indicated by the hour meters 128 and 129. When the position detecting pattern image 201 is scanned, the gate of the hour meter 128 is closed by position detecting signals supplied from the AND circuit at that point on the scanning line of the $n_1$ order which corresponds to the assumed scanning line of the $n_3$ order so as to measure an interval $t_2$ between the time when there are generated synchronizing pulses for axis X and the time when there are generated signals for detecting the position pattern image 201, thereby obtaining signals C associated with axis X converted to said assumed scanning line of the $n_3$ order.

The assumed scanning lines are supposed to have an $n$ number and the origin point of axis X is set at a point representing $(n/2) = V$ as in the case of the original point of axis Y. Signals associated with axis X which were obtained from the hour meter 128 are conducted to a subtracting counter 130 together with output signals V from the producer 124 of fixed value of axis of co-ordinates. Thus, the difference of $V - C = J$ is calculated to obtain signals for axis X representing said difference. Depending on the magnitude of said difference, axis X of the optical field of the position detecting pattern 201 will be positioned as follows:

If $V - C > 0$, on $-$ axis X

If $V - C = 0$, at a preset point on axis X

If $V - C < 0$, on $+$ axis X

Similarly, when the direction pattern image 202 is scanned, the gate of the hour meter 129 is closed by direction detecting signals supplied from the AND circuit 116 at that point on the scanning line of the $n_2$ order which corresponds to the assumed scanning line of the $n_4$ order so as to measure an interval between the time when there are generated synchronizing pulses associated with axis X and the time when there are generated direction pattern detecting signals, thereby obtaining axis X signals D converted to the assumed scanning line of the $n_4$ order. Said signals D are conducted to a subtracting counter 132 together with the aforesaid signals C to obtain signals for axis X denoting a difference $C - D = K$. From the magnitude of said difference, there can be detected the displacement of the direction pattern image 202 toward axis X with respect to the position pattern image 201. Thus the site of the direction pattern image 202 will be defined as follows.

If $C - D > 0$, nearer to $+$ axis X than C

If $C - D = 0$, on axis X as in the case of C

If $C - D < 0$, nearer to $-$ axis X than C

Signals K and I from the subtracting counters 132 and 127 which represent the displacement of the semiconductor pellet 101 toward axes X and Y are conducted to an angle detector 134 to determine the angle $\theta = \tan^{-1} I/K$ defined by said pellet 101 with axis X 206, the resulting signals denoting said angle being drawn out at the output terminal 135 of said angle detector 134.

When the semiconductor pellet 101 has an indefinite position and direction as described above, there are affixed to said pellet patterns for detection of its position and direction. The axes of these patterns in an optical field associated therewith are determined from the magnified images of said pellet and patterns. The inclination of the pellet to said axes is detected to determine its position and direction. There are drawn out true signals for detecting each pattern image from the logical circuit including the delay circuit shown in FIG. 1, thus rendering said detection extremely accurate. No matter what shape and form is assumed by a fine object, there may be affixed thereto a detection pattern without any limitation from other patterns attached thereto for the original object. Said detection pattern may not only have the form of multiple rings described in the aforementioned embodiments, but also fragmental shapes of said rings and other configurations, provided that, when scanned, they will present a prescribed width, interval and number of pulses.

The foregoing description relates to the case where there were determined the position and direction of a fine object by affixing thereto patterns for detecting said position and direction. However, where the fine object is fixed in direction by separate means, only its position will have to be determined. In such case, all that is required is to provide the semiconductor pellet 101 with a position detecting pattern alone and use a circuitry as shown in FIG. 9 which eliminates the AND circuits 121, 116, OR circuit 108, delay circuits 120a to 120d and 119, counter 123, hour meter 129, subtractors 127 and 132 and angle detector 134 shown in FIG. 1.

What we claim is:

1. A method for detecting the position and direction of a fine object which has a position detecting pattern and a direction detecting pattern on the surface thereof comprising:

projecting a magnified image of the fine object;

scanning said magnified image and generating first pulses having a prescribed width, interval and number responsive to scanning said position detecting pattern, and generating second pulses of another prescribed width, interval and number responsive to said direction detecting pattern, said first and second pulses being in spaced relationship with each other;

picking up said first and second pulses;

the scanning of said magnified image being performed by scanning lines $L_1$ to $L_n$ having an $n$ number ($n \geq 6$) and generating signals $L_1'$ to $L_n'$, containing information corresponding to said first and second pulses;

operating on said signals $L_1'$ to $L_n'$, including delaying said signals by predetermined amounts, to generate an output in accordance with the logical relationship $$(L_1' + L_2') \cdot (L_3' + L_4') \ldots (L_{n-1}' + L_n') + (L_1' \cdot L_2' \ldots L_{n/2}') = 1;\,;$$

operating on said output, including delaying said output by predetermined amounts, to separate said output into first signals for detecting a position pattern image and second signals for detecting a direction pattern image, said first and second signals defining the position and direction of the fine object.

2. A method according to claim 1 wherein the step of generating said signals $L_1'$ to $L_n'$ includes:

shaping signals obtained by said scanning of said magnified images;

delaying successively by a prescribed length of time a plurality of the signal components obtained by shaping the signals derived by scanning the magnified image of each pattern with one scanning line so as to generate said signal components simultaneously; and generating output signals $L_1'$ to $L_n'$ corresponding to scanning lines $L_1$ to $L_n$ only when said delayed signals are present at the same time.

3. A method according to claim 1 wherein the step of operating on said signals $L_1'$ to $L_n'$ comprises:

progressively delaying said signals $L_1'$ to $L_n'$ to generate said signals $L_1'$ to $L_n'$ simultaneously;

obtaining OR logical outputs $(L_1'+L_2')$, $(L_3'+L_4')$ ... and $(L_{n-1}+L_n')$ respectively corresponding to logical of said signals $L_1'$ and $L_2'$, $L_3'$ and $L_4'$ ..., and $L_{n-1}'$ and $L_n'$, which pairs of signals are obtained by scanning with two successive scanning lines;

obtaining first AND logical signals $(L_1'+L_2')\cdot(L_3'+L_4)$... $(L_{n-1}'+L_n')$ corresponding to said OR ological outputs;

obtaining second AND logical signals $(L_1'+L_2'\cdots L_{n/2})$ corresponding to signals $(L_1', L_2' ... L_{n/2}')$ obtained by scanning with scanning lines having a $n/2$ number; and obtaining an OR logical output $(L_1'+L_2') : (L_3'+L_4')\cdot ...\cdot(L_{n-A1}'+L_n')+(L_1'\cdot L_2'\cdot L_2'\cdot(L_{n/2}')$ from said first and second AND logical signals.

4. A method according to claim 1 wherein the step of operating on said output for detecting the position and direction pattern images comprises:

first delaying the position pattern signals only by the operation time required to carry out the operations on said $L_1'$ to $L_n'$ signals;

generating AND logical signals from said output signal generated by operating on said $L_1'$ to $L_n'$ signals and the output from first delaying the position pattern signals;

second delaying signals representing the direction pattern image only by the operation time required to carry out the operations on said $L_1'$ to $L_n'$ signals; and generating AND logical signals from said output signal generated by operating on said $L_1'$ to $L_n'$ signals and output from second delaying said signals representing said direction pattern image.

5. A method according to claim 1 including:

generating signals corresponding to values for defining the axes of a co-ordinate system;

counting the number of scanning lines required to obtain signals for detecting the position detecting pattern image and generating counting output signals corresponding to said number;

measuring a length of time required for one scanning line to reach the position detecting pattern image and generating a time measure signal corresponding to said length of time;

subtracting at least one of said counting output signals and said time-measure signal and those generated signals corresponding to values defining the co-ordinate axes;

counting the number of scanning lines used in obtaining the signal for detecting a direction detecting pattern image;

measuring a length of time required for one scanning line to reach said direction detecting pattern; and determining the angle at which the fine object is inclined to the co-ordinate axes by operating on the output signals from said counting and time-measuring steps.

6. Apparatus for detecting the position and direction of a fine object which has a position detecting pattern and a direction detecting pattern on the surface thereof comprising:

means for projecting a magnified image of said fine object;

means for scanning said magnified image;

means for generating first pulses having a prescribed width, interval and number responsive to scanning said position detecting pattern, and for generating second pulses of another prescribed width, interval and number responsive to said direction detecting pattern, said first and second pulses being in spaced relationship with each other;

means for picking up said first and second pulses;

said means for scanning including means for producing scanning lines $L_1$ to $L_n$ having an $n$ number ($n$ 6) and for generating signals $L_1'$ to $L_n'$, containing information corresponding to said first and second pulses;

means including a first delay means for operating on said signals $L_1'$ to $L_n'$, including delaying said signals by predetermined amounts by means of said first delay means, to generate an output in accordance with the logical relationship $(L_1'+L_2')\cdot(L_3+L_4') ... (L_{n-1}'+L_n')+(L_1'\cdot L_2' ...L_{n/2}')=1$;

means including a second delay means for operating on said output, including delaying said output by predetermined amounts by means of said second delay means, to separate said output into first signals for detecting a position pattern image and second signals for detecting a direction pattern image, said first and second signals defining the position and direction of the fine object.

7. Apparatus according to claim 6 wherein said means for generating said signals $L_1'$ to $L_n'$ includes:

means for shaping signals obtained by said scanning of said magnified images;

said first delay means delaying successively by a prescribed length of time a plurality of the signal components from said shaping means, which signal components are obtained by shaping the signals derived by scanning the magnified image of each pattern with one scanning line so as to generate said signal components simultaneously; and means for generating output signals $L_1'$ to $L_n'$ corresponding to scanning lines $L_1$ to $L_n$ only when said delayed signals are present at the same time.

8. Apparatus according to claim 6 wherein said means for operating on said signals $L_1'$ to $L_n'$ comprises:

said first delay means for progressively delaying said signals $L_1'$ to $L_n'$ to generate said signals $L_1'$ to $L_n'$ simultaneously;

first logical OR means for generating first OR logical outputs $(L_1'+L_2')$, $(L_3'+L_4')$ ... and $(L_{n-1}+L_n')$ respectively corresponding to pairs of said signals $L_1'$ and $L_2'$, $L_3'$ and $L_4'$ ..., and $L_{n-1}'$ and $L_n'$, which pairs of signals are obtained by scanning with two successive scanning lines;

first logical AND means for receiving said OR logical outputs and generating first AND logical signals $(L_1'+L_2')\cdot(L_3'+L_4')...(L_{n-1}'+L_n')$ corresponding to said OR logical outputs;

second logical AND means for generating second AND logical signals $(L_1'\cdot L_2'$ corresponding to signals $(L_1', L_2' ... L_{n/2}')$ obtained by scanning with scanning lines having a $n/2$ number; and second logical OR means coupled to said first and second logical AND means for generating an OR logical output $(L_1'+L_2')\cdot(L_3'+L_4')... \cdot(L_{n-1}'+L_n')+(L_{AM}'\cdot L_2'\cdot L_2'\cdot ...(L_{n/2}')$ from said first and second AND logical signals.

9. Apparatus according to claim 6 wherein said means for operating on said output for detecting the position and direction pattern images comprises:

said second delay means for delaying the position pattern signals only by the operation time required to carry out the operations on said $L_1'$ to $L_n'$ signals by the first mentioned operating means;

third logical AND means coupled to said second delay means and to said first mentioned operating means for generating third AND logical signals from said output signal generated by operating on said $L_1'$ to $L_n'$ signals and the output from second delay means;

third delay means for delaying signals representing the direction pattern image only by the operation time required to carry out the operations on said $L_1'$ to $L_n'$ signals by said first mentioned operating means; and fourth logical AND means coupled to said third delay means and to said first mentioned operating means for generating AND logical signals from said output signal generated by operating on said $L_1'$ to $L_n'$ signals and the output from third delay means, said signals representing said direction pattern image.

10. Apparatus according to claim 6 including:

means for generating signals corresponding to values for defining the axes of a co-ordinate system;

first counting means for counting the number of scanning lines required to obtain signals for detecting the position detecting pattern image and for generating first counting output signals corresponding to said number;

measuring means for measuring a length of time required for one scanning line to reach the position detecting pattern image and for generating a time measure signal corresponding to said length of time;

means for subtracting at least one of said counting output signals and said time-measure signal and those generated signals corresponding to said values defining the co-ordinate axes;

second counting means for counting the number of scanning lines used in obtaining the signal for detecting a direction detecting pattern image;

measuring means for measuring a length of time required for one scanning line to reach said direction detecting pattern; and means coupled to said counting and measuring means for calculating the angle at which the fine object is inclined to the co-ordinate axes by operating on the output signals from said counting and time-measuring means.

* * * * *